United States Patent
Yamada et al.

(10) Patent No.: US 7,596,368 B2
(45) Date of Patent: Sep. 29, 2009

(54) WIRELESS ACCESS POINT APPARATUS AND METHOD OF ESTABLISHING SECURE WIRELESS LINKS

(75) Inventors: Katsuhiko Yamada, Kanagawa (JP); Azuma Tsubota, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 501 days.

(21) Appl. No.: 11/354,989

(22) Filed: Feb. 16, 2006

(65) Prior Publication Data
US 2006/0200678 A1 Sep. 7, 2006

(30) Foreign Application Priority Data
Mar. 4, 2005 (JP) ............................. 2005-061210

(51) Int. Cl.
*H04M 1/66* (2006.01)
(52) U.S. Cl. .................. 455/411; 455/561; 455/41.2; 380/247; 380/270; 380/277; 380/278; 380/281; 726/3; 726/5; 726/17; 726/21; 713/168; 713/170; 713/171; 713/182
(58) Field of Classification Search .............. 455/41.2, 455/410, 411, 561; 726/2, 3, 5, 17, 21; 713/155, 713/156, 168, 169, 170, 171, 182, 184, 185, 713/186; 380/247–250, 270, 277–285; 370/328, 370/338
See application file for complete search history.

(56) References Cited
U.S. PATENT DOCUMENTS

| 7,236,477 B2 * | 6/2007 | Emeott et al. ............... 370/331 |
| 7,325,246 B1 * | 1/2008 | Halasz et al. ................. 726/2 |
| 7,373,508 B1 * | 5/2008 | Meier et al. ................ 713/168 |
| 2004/0073793 A1 * | 4/2004 | Takeda ...................... 713/168 |
| 2005/0032506 A1 * | 2/2005 | Walker ....................... 455/411 |
| 2005/0059379 A1 * | 3/2005 | Sovio et al. ................. 455/411 |
| 2005/0138359 A1 * | 6/2005 | Simon et al. ................ 713/156 |
| 2005/0201564 A1 * | 9/2005 | Kayashima et al. ......... 380/283 |
| 2005/0254653 A1 * | 11/2005 | Potashnik et al. ........... 380/270 |
| 2006/0083377 A1 * | 4/2006 | Ptasinski ................... 380/270 |

(Continued)

OTHER PUBLICATIONS

Lusheng JI et al., "Self-Organizing Security Scheme for Multi-Hop Wireless Access Networks", IEEE 2004 Aerospace Conference, Big Skye, MT, Mar. 2004, available as of Feb. 3, 2005 on the internet at http://www.flacp.fujitsulabs.com/Aerospace04-51.pdf.

*Primary Examiner*—Charles N Appiah
*Assistant Examiner*—Olumide T Ajibade Akonai
(74) *Attorney, Agent, or Firm*—Venable LLP; Michael A. Sartori; Justine A. Gozzi (57) ABSTRACT

A wireless network is connectable to an authentication server. Each access point in the wireless network includes a supplicant processing unit, an authenticator processing unit, and a function selector. When an access point is detected within communication range, the function selector selects either the supplicant processing unit or the authenticator processing unit. The selected unit operates to carry out or mediate an authentication protocol and establish a secure wireless link, protected by a pairwise encryption key, between the two access points. Because every access point can operate as either an authenticator or a supplicant, it is not necessary to invoke the services of a master authenticator. If an encryption key is compromised, the effect is limited and does not force the entire network to be shut down.

12 Claims, 6 Drawing Sheets

U.S. PATENT DOCUMENTS

2006/0126845 A1* 6/2006 Zheng .................. 380/270
2006/0200670 A1* 9/2006 Kuffel et al. ............ 713/170
2007/0118742 A1* 5/2007 Abhishek et al. ........... 713/160
2007/0171870 A1* 7/2007 Oba et al. ................ 370/331

* cited by examiner

WIRELESS ACCESS POINT APPARATUS AND METHOD OF ESTABLISHING SECURE WIRELESS LINKS

BACKGROUND OF THE INVENTION

1. Field of the Invention

The present invention relates to a wireless communication network, more particularly to the access point apparatus in a wireless mesh network, and still more particularly to a method of establishing secure wireless links between access points.

2. Description of the Related Art

The mesh network architecture, which uses wireless links between access points, provides a simple and flexible way to extend the coverage area of a wireless local area network (LAN). Applications are expected to appear in homes, offices, college campuses, and other areas, and standardization of the architecture is under study by the Institute of Electrical and Electronics Engineers (IEEE) within the framework of the IEEE 802.11i group of wireless LAN standards.

Wireless LANs in general are at risk from eavesdropping, spoofing, and other well-known forms of tampering, including the setting up of unauthorized access points. In a mesh network these risks are increased, because access points can be set up almost without restriction and communications may be relayed over considerable distances. Authentication and protection of communication is therefore a critical issue, as discussed in, for example, Ji et al, 'Self-Organizing Security Scheme for Multi-Hop Wireless Access Networks', IEEE 2004 Aerospace Conference, Big Skye, Mont., March 2004, available as of Feb. 3, 2005 on the Internet at http://www-.flacp.fujitsulabs.com/Aerospace04-51.pdf.

The above paper proposes an encryption key management system in which all access points in a network share a single group key distributed from a master access point. Consequently, if the group key is compromised at even one access point, the security of the entire network is endangered.

When this happens, it is necessary to halt all communication in the network and change the group key. Needless to say, this temporary shutdown of the entire network is a major inconvenience to network users. A similar inconvenience occurs when an access point is temporarily removed from the network for servicing or repair, because that involves a risk of possible key disclosure, and the group key must be changed to forestall the risk.

The inconvenience is particularly great when the network is large in scale or is connected to a wired network and forms part of the local infrastructure of the area in which it is used. Since mesh networks are expected to be large in scale and to operate in the infrastructure mode, there is an urgent need for a solution to this problem.

That is, from the standpoints of both network security and network operations, there is a need for wireless access point apparatus and connection processing methods that can establish secure wireless links between wireless access points without widespread sharing of encryption keys.

SUMMARY OF THE INVENTION

An object of the present invention is to provide wireless access point apparatus that can establish secure wireless links between access points in a wireless mesh network by using a separate encryption key for each link.

The invented wireless network includes a plurality of access points and at least one authentication server. Each access point has access point apparatus including a supplicant processing unit, an authenticator processing unit, and a function selector.

The supplicant processing unit requests authentication processing by a predetermined authentication method and supplies the necessary authentication information to an authenticator device. The authenticator processing unit mediates authentication processing requested by another device, such as another access point, by forwarding the authentication request and authentication information toward the authentication server, and passing information received from the authentication server to the requesting device. The function selector operates when an unconnected access point is detected within communication range, and selects either the supplicant processing unit or the authenticator processing unit. The selected supplicant processing unit or authenticator processing unit then operates in cooperation with the authenticator processing unit or supplicant processing unit at the unconnected access point to establish a secure wireless link between the two access points.

Because every access point can operate as either an authenticator or a supplicant, when a new connection between access points is established, the two access points involved can handle the authentication procedure and distribution of encryption keys themselves (with the cooperation of the authentication server), without having to share these encryption keys with other access points. Since the encryption key that secures a wireless link is not stored at any access point other than the access points at the two ends of the link, the security of the link will not be compromised by a problem occurring at another access point.

For the same reason, in the event that an encryption key is compromised, the effect is localized and can be isolated without the need to shut down the entire wireless network.

DETAILED DESCRIPTION OF THE INVENTION

A wireless mesh network, access point apparatus, and access method embodying the invention will now be described with reference to the attached drawings, in which like elements are indicated by like reference characters.

It will be assumed that the wireless mesh network uses the access point authentication protocol described in the IEEE 802.1x standards, and that each access point in the network has the authenticator function and the supplicant function described in the IEEE 802.1x standards.

Figure 1:
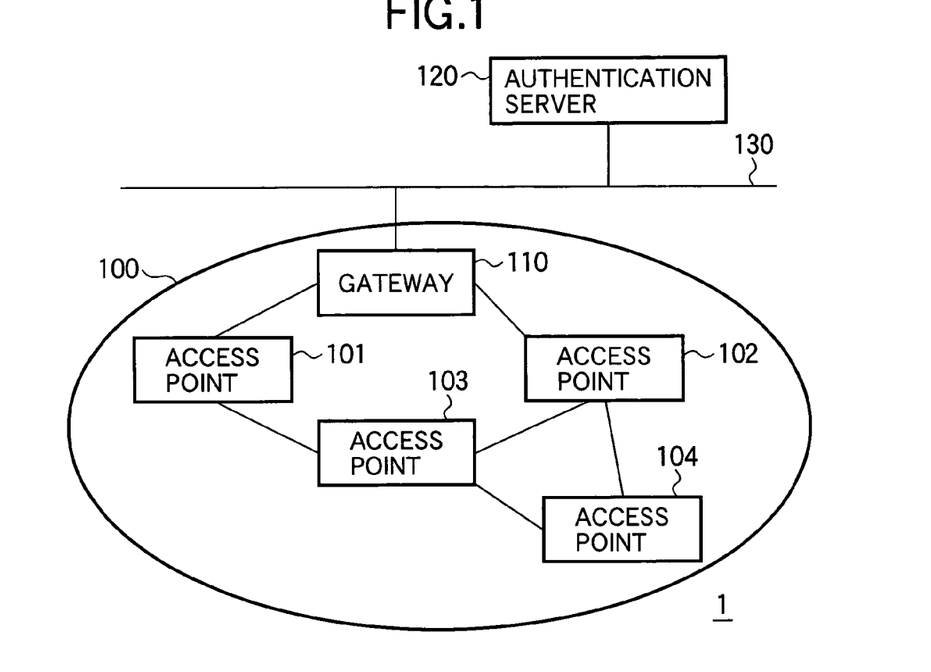
FIG. 1 shows the general structure of a network embodying the present invention.

Referring to FIG. 1, the wireless mesh network 100 includes four access points 101 to 104 and a gateway device 110. The gateway device 110 is an access point that is also connected to an external network. In this embodiment, the gateway device 110 is connected to an authentication server 120 via a wired network 130. The authentication server 120 authenticates the access points 101 to 104, the gateway device 110, and wireless terminal devices (not shown) by following the IEEE 802.1x authentication protocol.

The functions implemented by the authentication server 120 include at least the following: managing registered authentication information relating to the access points 101 to 104, the gateway device 110, and wireless terminal devices; generating the seeds of encryption keys for encrypted communication on the wireless links between the access points; and distributing the generated encryption key seeds to the access points 101 to 104 and gateway device 110. In particular, the authentication server 120 may implement the Remote Authentication Dial-In User Server (RADIUS) functions described in these standards.

The authentication protocol followed by the authentication server 120 is not limited to the IEEE 802.1x protocol, provided it allows access points to forward authentication requests from neighboring access points and return authentication results to the neighboring access points, and allows the distribution of encryption key seeds for generating pairwise encryption keys for the wireless links between access points.

The access points 101 to 104, including the gateway device 110, establish wireless connections or 'associations' with wireless terminals (not shown) that are within communication range, and forward information to other access points that are within communication range. Information can thereby reach its destination in a series of hops. An access point mediates communication between its associated wireless terminals, between these wireless terminals and wireless terminals associated with other access points, and between these wireless terminals the wired network 130, or possibly with other external networks (not shown).

In the following description, the term 'neighboring access point' will be used to denote an access point (possibly the gateway device 110) that is within direct wireless communication range of a given access point.

The gateway device 110 implements the functions of an access point, and also connects the wireless mesh network 100 to the wired network 130, thereby making the functions of devices in the wired network 130 and possibly other external networks available to devices within the wireless mesh network 100. In particular, the gateway device 110 in this embodiment gives the access points 101 to 104 access to the authentication server 120.

Each access point 101 to 104 and the gateway device 110 has the authenticator function and the supplicant function described in the IEEE 802.1x standards, and can participate in the authentication of neighboring access points, as well submitting authentication requests on its own behalf.

Accordingly, when a new access point is added, for example, its authentication processing does not have to be mediated by a master authenticator node as called for in the prior art cited above; any neighboring access point can act as the authenticator. This arrangement avoids the problem of stoppage of authentication because of a failure at the master authenticator node, and helps distribute the load of authentication processing.

The access points 101 to 104 and gateway device 110 also generate encryption keys, using encryption key seeds distributed from the authentication server 120 over wireless links between access points that have been successfully authenticated, and manage pairwise encryption keys for each wireless link. Since the encryption keys are generated for individual wireless links and are managed separately at each access point, in the eventuality that an encryption key is compromised, the damage does not spread to the wireless mesh network 100 as a whole.

Figure 2:
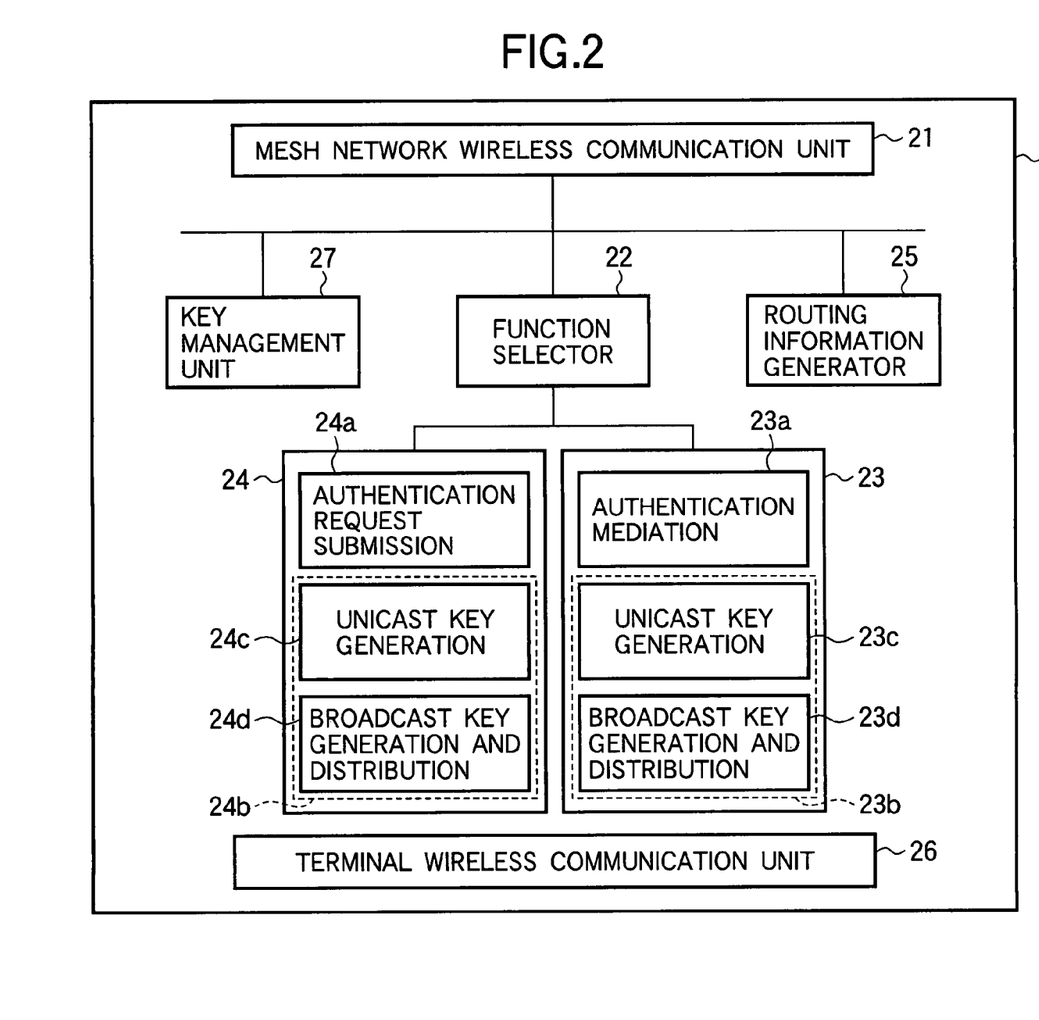
FIG. 2 is a block diagram of wireless access apparatus embodying the invention.

Referring to FIG. 2, each access point 101 to 104 and the gateway device 110 has wireless access apparatus 2 comprising at least a mesh network wireless communication unit 21, a function selector 22, an authenticator processing unit 23, a supplicant processing unit 24, a routing information generator 25, a terminal wireless communication unit 26, and a key management unit 27. The wireless access apparatus 2 also includes an authenticator processing unit for authenticating wireless terminals, but this function has been omitted to avoid obscuring the invention with needless detail.

The mesh network wireless communication unit 21 performs wireless communication with neighboring access points by using a predetermined wireless communication method.

The function selector 22 selects and activates the authenticator processing unit 23 or supplicant processing unit 24. The function selector 22 at a given access point operates when an unconnected neighboring access point is detected; that is, when an access point is detected that is within communication range of the given access point but does not yet have a secure wireless link to the given access point.

The authenticator processing unit 23 executes the functions of an authenticator as defined in the IEEE 802.1x standards. These functions include, for example, forwarding authentication requests and information from supplicant access points to the authentication server 120, generating unicast encryption keys (unicast keys) and broadcast encryption keys (broadcast keys), and distributing broadcast keys. Accordingly, the authenticator processing unit 23 has an authentication mediation section 23a and an encryption information generator 23b, the encryption information generator 23b including a unicast key generation section 23c and a broadcast key generation and distribution section 23d.

The supplicant processing unit 24 executes the functions of a supplicant as defined in the IEEE 802.1x standards. These functions include, for example, submitting an authentication request to an authenticator access point and, like the authenticator processing unit 23, generating unicast and broadcast keys and distributing broadcast keys. Accordingly, the supplicant processing unit 24 has an authentication request submission section 24a and an encryption information generator 24b, the encryption information generator 24b including a unicast key generation section 24c and a broadcast key generation and distribution section 24d.

The two encryption information generators 23b, 24b are shown separately in FIG. 2, but they are identical and may be combined into a single shared unicast key generation section and a broadcast key generation and distribution section.

A unicast key is used for encrypting communication on a particular wireless link between two access points. The number of unicast keys managed by a wireless access apparatus 2 depends on the number of wireless links that connect the wireless access apparatus 2 to other access points.

A broadcast key is used for encrypting communications directed toward a plurality of access points. The number of broadcast keys managed by a wireless access apparatus 2 depends on the number of neighboring access points (and thus depends on the number of wireless links). The wireless access apparatus 2 must store one broadcast key to encrypt outgoing broadcasts, and one broadcast key for each neighboring access point to decrypt broadcasts received from that access point.

The routing information generator 25 generates routing information for the wireless mesh network 100 according to a prescribed routing protocol. Known types of routing protocols include reactive protocols that determine routes dynamically when communication takes place, proactive protocols that determine routes in advance, typically when a connection is changed, and hybrid protocols that combine both reactive and proactive techniques. The present embodiment employs a proactive or a hybrid protocol.

The terminal wireless communication unit 26 carries out wireless communication with associated terminal devices, also referred to as client terminals (not shown).

The key management unit 27 manages the three types of keys described above: unicast keys, broadcast keys for decrypting incoming broadcast communications, and a broadcast key for encrypting outgoing broadcast communications.

Each access point also broadcasts a beacon signal to announce its presence in the wireless mesh network 100. The beacon signal includes information identifying the network 100, such as a service set identifier (SSID), and information identifying the access point by which it is broadcast, such as a basic service set identifier (BSSID).

Next the operations for establishing a secure bidirectional wireless link with a newly added access point, for establishing a new secure bidirectional wireless link to an access point that that is already linked securely to another access point, and for recovering from a gateway failure will be described.

Figure 3:
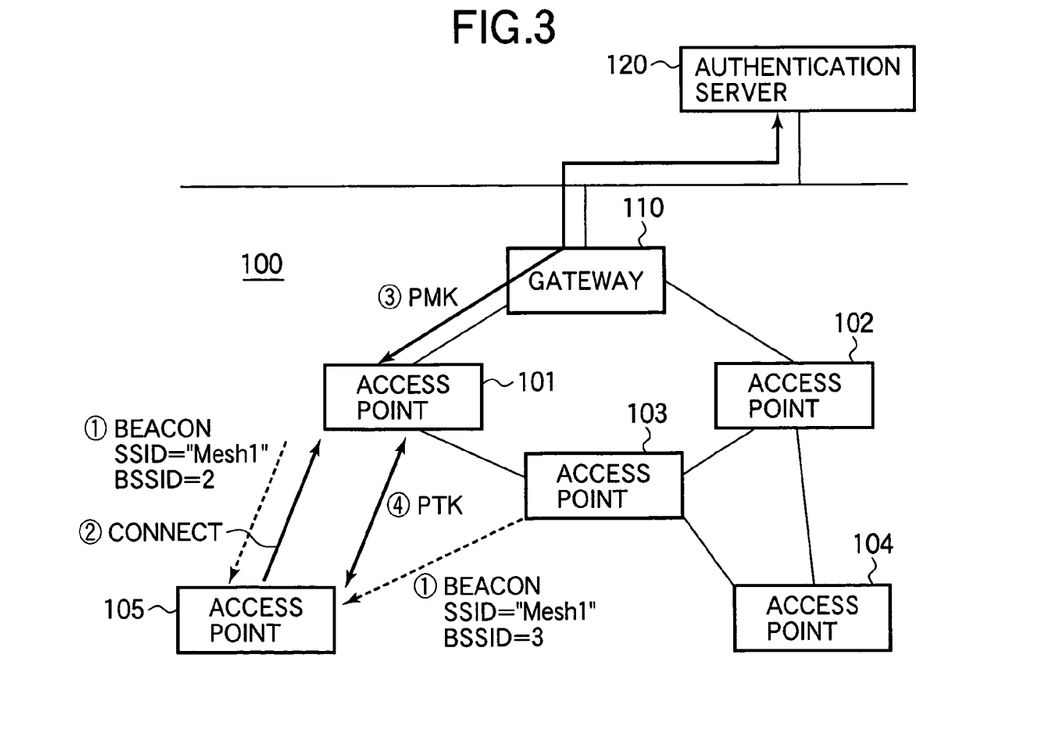
FIG. 3 illustrates the process by which a new access point is added to the network in FIG. 1.

Referring to FIG. 3, when a new access point 105 is added to the wireless mesh network 100, it begins by broadcasting its own beacon signal and attempting to receive beacon signals from existing access points in the network. In FIG. 3, access point 105 receives the beacon signal broadcast by access point 101, including the network identifier (SSID) 'Mesh1' and access point identifier '2', and the beacon signal broadcast by access point 103, with network identifier 'Mesh1' and access point identifier '3'. Access point 105 selects one of the received beacon signals, such as the beacon signal with the greatest received signal strength. In the following description, it will be assumed that access point 105 selects the beacon signal broadcast by access point 101 and proceeds to establish a secure wireless link with access point 101.

The sequence by which this is done is indicated roughly by the steps shown in FIG. 3: (1) reception of beacon signals; (2) connection; (3) authentication and distribution of pairwise master key (PMK); and (4) generation of pairwise transient key (PTK). The procedure is illustrated in more detail in FIGS. 4 and 5.

Figure 4:
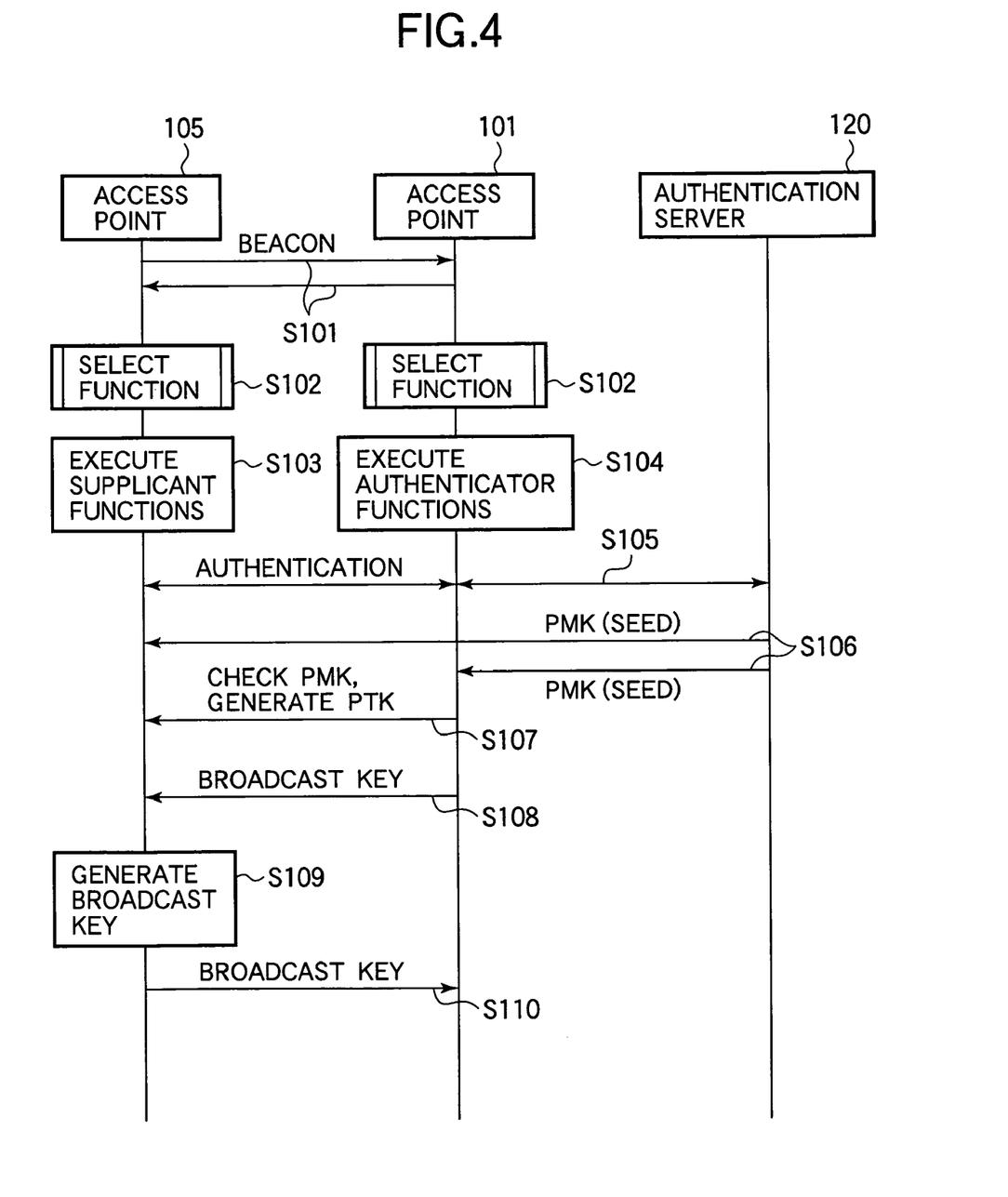
FIG. 4 illustrates the sequence of steps in the process in FIG. 3.

In step S101 in FIG. 4, access point 101 receives the beacon signal transmitted by access point 105 and access point 105 receives the beacon signal transmitted by access point 101. At this point access points 101 and 105 can communicate with each other, but do not yet have a secure wireless link.

Figure 5:
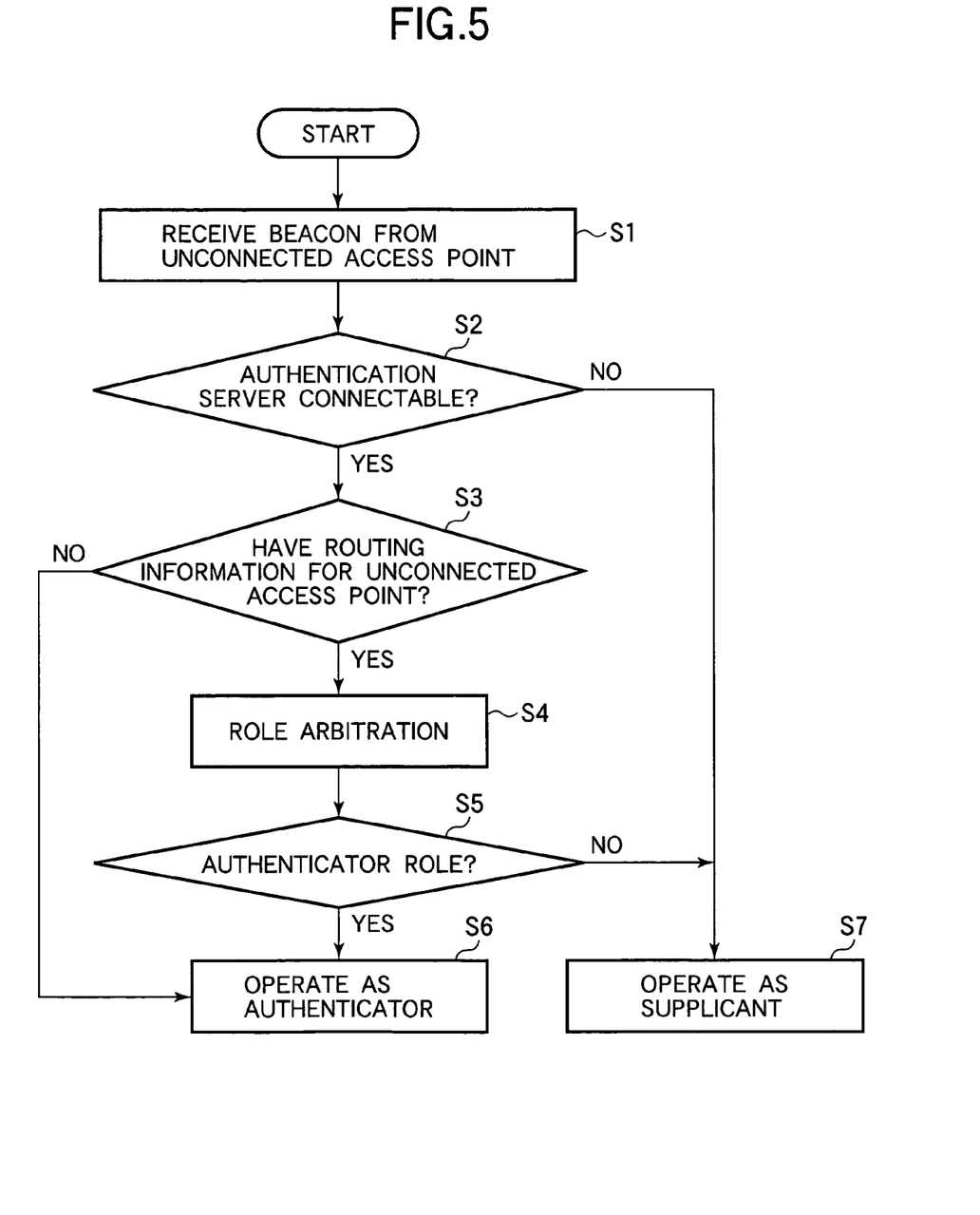
FIG. 5 is a flowchart illustrating the function selection procedure in the present invention.

In step S102, the function selectors 22 in access points 101 and 105 select the authenticator processing unit 23 or the supplicant processing unit 24 at each access point. The selection procedure is illustrated in FIG. 5. Step S1 in FIG. 5 is the reception of a beacon signal, corresponding to step S101 in FIG. 3.

In step S2 in FIG. 5, the function selector 22 decides whether its access point can connect to the authentication server 120. Various methods of making this decision are available. In one well-known method, each access point 101 to 105 is pre-equipped with the Internet Protocol (IP) address of the authentication server 120 and the access point transmits a so-called ping packet addressed to the authentication server 120. If a returning reply or 'echo' is received, the function selector 22 decides that the access point can connect to the authentication server 120.

If the authentication server 120 is connectable, the function selector 22 next decides whether the routing information generator 25 has generated routing information for the access point from which the beacon signal was received. This decision can also be made by various methods, such as searching a routing table maintained by the routing information generator 25.

If the routing information generator 25 has generated routing information for the access point from which the beacon signal was received, the function selector 22 begins a role arbitration process by communicating with the function selector 22 at the access point from which the beacon signal was received (step S4). On the basis of this arbitration process, the function selector decides whether its own access point should act as the authenticator or the supplicant (step S5). The function selector then activates the authenticator processing unit 23 (step S6) or the supplicant processing unit 24 (step S7).

If the function selector 22 decides that the access point cannot connect to the authentication server 120 ('No' in step S2), the access point must operate as the supplicant (step S7). Conversely, if the access point can connect to the authentication server 120 but does not have routing information for the other access point with which it is trying to connect ('No' in step S3), it must operate as the authenticator (step S6).

In the present case, it will be assumed that the new access point 105 does not have routing information for access point 101, or cannot connect to the authentication server 120, and therefore acts as the supplicant. This is reported to access point 101 in the role arbitration process, and access point 101 accordingly acts as the authenticator.

Returning to FIG. 4, access point 105 executes the supplicant processing unit 24 (step S103) while access point 101 executes the authenticator processing unit 23 (step S104).

The authentication protocol specified in the IEEE 802.1x standards is now followed to authenticate access point 105. In this process, access point 105 submits an authentication request, access point 101 forwards the request to the authentication server 120, and access point 105 and the authentication server 120 carry out a well-known authentication procedure, with access point 101 acting as an intermediary by relaying communication between the authentication server 120 and access point 105. If authentication succeeds, the authentication server 120 generates a pairwise master key (PMK), which is a type of seed to be used in generating encryption keys for unicast communication between access points 101 and 105, and distributes this PMK seed to access points 101 and 105 (step S106).

When access points 101 and 105 have received the PMK seed from the authentication server 120, they confirm that they have identical seed information, and proceed to generate a unicast key such as a pairwise transient key (PTK) from the seed (step S107). This unicast key is stored in the key management unit 27 at each access point 101 and 105 and becomes an individual encryption key for use only on the wireless link between access points 101 and 105.

Next, the authenticator processing unit 23 in access point 101 uses the unicast key to send access point 105 an encrypted message including the broadcast key that access point 101 uses to encrypt outgoing broadcast communications (step S108). Access point 105 receives this message and decrypts it with the unicast key, and the key management unit 27 in access point 105 stores the decrypted broadcast key.

Similarly, the supplicant processing unit 24 in access point 105 generates a broadcast key that it will use to encrypt communications broadcast to neighboring access points (step S109) and sends access point 101 a copy of this broadcast key, encrypted with the unicast key (step S110). The key management unit 27 in access point 101 stores a decrypted copy of this broadcast key.

In step S108, if access point 101 does not already have a broadcast key, it generates one and distributes encrypted copies of the newly generated broadcast key to its other neighboring access points, as well as to access point 105. Broadcast keys can also be distributed by the broadcast or multicast methods used in the ad hoc mode of communication.

After these operations, access point 105 is connected to access point 101 via a secure wireless link, and can also send and receive broadcast communications securely, although so far its broadcast partners are limited to access point 101. The routing information generator 25 at access point 105 now proceeds to acquire routing information for the other access points 102, 103, 104 and the gateway device 110.

Figure 6:
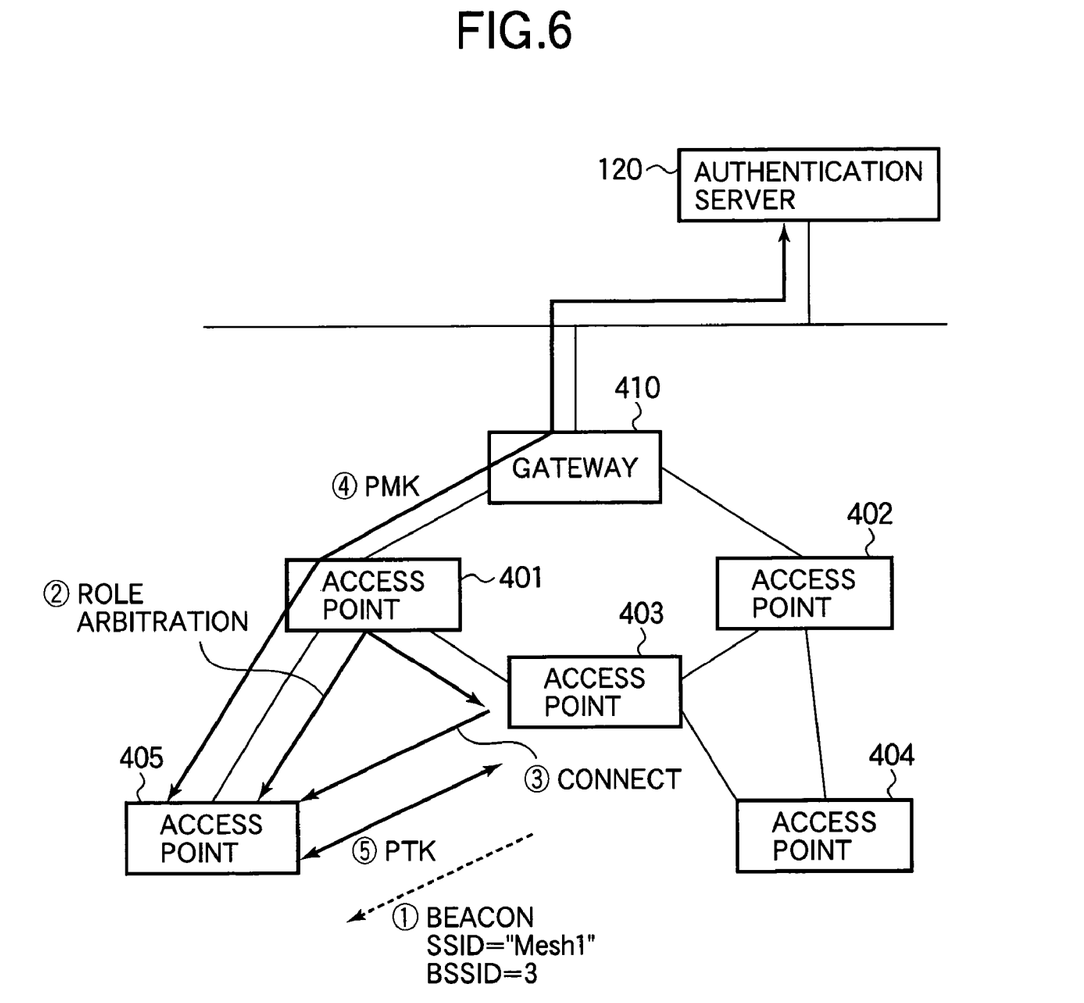
FIG. 6 illustrates the process by which the new access point added in FIG. 3 is connected to another neighboring access point.

Referring to FIG. 6, after acquiring routing information, access point 105 proceeds to establish a secure wireless link with access point 103. The procedure is generally similar to the procedure by which it established the secure wireless link with access point 101: (1) beacon signal reception; (2) authenticator mediation; (2) connection; (4) authentication and pairwise master key distribution; and (5) pairwise transient key generation. This procedure will be described in more detail with reference again to FIGS. 4 and 5.

In step S101, access points 103 and 105 receive each other's beacon signals. Each accesses point recognizes the other as an unconnected access point that is within communication range. Being within communication range is indicated by, for example, the received signal strength of the beacon signal.

In step S102, the function selector 22 at each access point 103, 105 selects the authenticator processing unit 23 or supplicant processing unit 24, again following the procedure illustrated in FIG. 5.

Step S1 (beacon reception) in FIG. 5 is the same as step S101 in FIG. 4.

Since both access points 103 and 105 are already connected to the wireless mesh network 100, both can connect to the authentication server 120 and each access point possesses routing information for the other access point. The decisions in steps S2 and S3 are accordingly 'Yes' at both access points 103 and 105.

This brings both access points to step S4, in which they work out the assignment of the authenticator and supplicant roles by predetermined arbitration rules. One known rule compares the media access control (MAC) addresses built into each access point apparatus: the access point with the higher MAC address becomes the authenticator; the access point with the lower MAC address becomes the supplicant. Other possible rules involve a hop-count comparison or a comparison of processing capability. Any of these methods involves an exchange of management information between access points 103 and 105, which in this case takes place through the access point 101 to which both access points 103 and 105 are already securely linked, and leads to a role decision (step S5) at each access point. In the following description, it will be assumed that access point 103 assumes the role of authenticator (step S6) and access point 105 again assumes the role of supplicant (step S7).

Returning to FIG. 4, the supplicant processing unit 24 operates at access point 105 (step S103) and the authenticator processing unit 23 operates at access point 103 (step S104). Access point 105 submits another authentication request, which is mediated by access point 103 (step S105), with authentication information passing through access point 101 as shown in FIG. 6 due to the network topology.

The rest of the procedure is substantially the same as before: the authentication server 120 authenticates access point 105 again and distributes a pairwise master key (PMK) to both access points 103, 105 (step S106); access points 103 and 105 confirm that they have the same PMK and generate unicast keys or PTKs (step S107); access point 103 sends its broadcast key to access point 105 (step S108); and access point 105 sends its broadcast key to access point 103 (step S110).

This procedure establishes a secure wireless link between access points 103 and 105. In addition, access point 105 can broadcast encrypted information simultaneously to access points 101 and 103, and can receive and decrypt encrypted broadcasts from either access point 101 or access point 103.

When a new access point is connected to the wireless mesh network 100, the procedures shown in FIGS. 3 to 6 are used to establish secure wireless links with all existing access points within communication range of the new access point, one after another.

Figure 7:
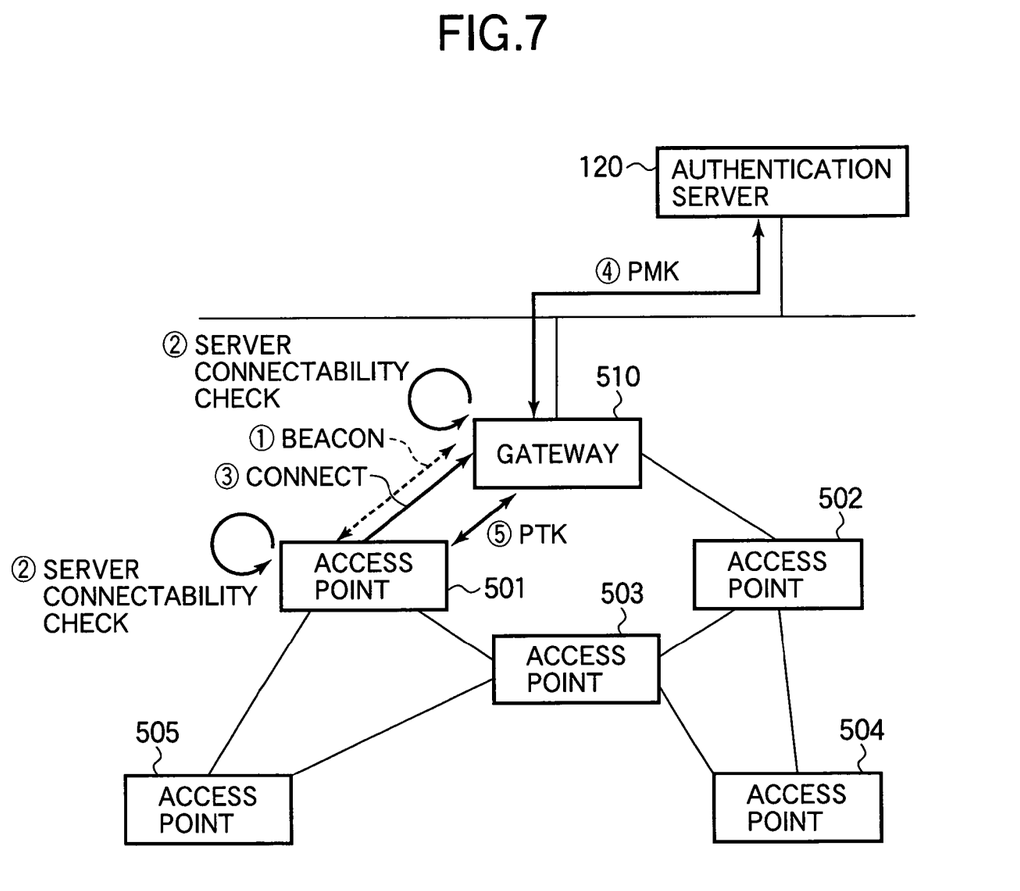
FIG. 7 illustrates the process by which a connection is reestablished after the gateway device in FIG. 6 recovers from a failure.

FIG. 7 illustrates the process carried out when a problem occurs in the gateway device 110 and the gateway device 110 has to be taking out of service temporarily and reset to an initial unconnected state.

While the gateway device 110 is out of service, the wireless mesh network 100 continues to function normally, except that it cannot provide authentication service or access to other services offered by the wired network 130. After the gateway device 110 recovers and is connected normally to the wired network 130, a secure wireless link between the gateway device 110 and access point 101 is reestablished by a procedure that includes (1) reception of a beacon signal, (2) test of connectability to the authentication server 120, (3) connection, (4) authentication and distribution of a pairwise master key, and (5) generation of a pairwise transient key. This procedure will be described in more detail with reference again to FIGS. 4 and 5.

In step S101 in FIG. 4, the access point 101 and gateway device 110 receive each other's beacon signals.

In step S102, the function selector 22 at each access point 103, 110 selects the authenticator processing unit 23 or supplicant processing unit 24, once again following the procedure illustrated in FIG. 5.

Step S1 (beacon reception) in FIG. 5 is the same as step S101 in FIG. 4.

In steps S2 and S3, since access point 101 has lost its connection to the gateway device 110 while the gateway device 110 was out of service, access point 101 cannot access the wired network 130 and cannot connect with the authentication server 120. Since the gateway device 110 has recovered internally, it can connect to the authentication server 120 via the wired network 130, but it has lost its routing table and does not have routing information for access point 101. Accordingly, the gateway device 110 functions as the authenticator (step S6) while access point 101 functions as the supplicant (step S7).

Returning to FIG. 4, the supplicant processing unit 24 operates at access point 101 (step S103) and the authenticator processing unit 23 operates at the gateway device 110 (step S104). Access point 101 submits an authentication request through the gateway device 110 to the authentication server 120 (step S105). The authentication server 120 authenticates access point 101 and distributes a pairwise master key (PMK)

to the gateway device 110 and access point 101 (step S106); the gateway device 110 and access point 101 confirm that they have the same PMK and generate unicast keys or PTKs (step S107); gateway device 110 sends its broadcast key to access point 101 (step S108); and access point 101 sends its broadcast key to the gateway device 110 (step S109).

The gateway device 110 and access point 101 now have a secure wireless link for unicast communication, and can also decrypt each other's broadcast communications.

Next, a similar procedure is used to reestablish secure wireless links between the gateway device 110 and any other access points within communication range.

If a problem at one of the general access points 101 to 105 forces the access point to be taken out of service, after it recovers, it is reconnected by following the same procedure as when a new access point is added to the access point 101.

In particular, if a security leak occurs and the encryption keys stored at a particular access point are compromised, security can be restored by shutting down the access point at which the leak occurred, then reconnecting it to the network, so that it acquires a new set of encryption keys. To nullify the effect of the leak completely, it may also be necessary for the access point where the leak occurred and the access points to which it was connected to generate new broadcast keys, but this is a relatively simple procedure, not requiring connection to the authentication server 120.

As described above, the invention minimizes the effect of security leaks and provides a wireless network with a high degree of security.

Since the invention uses the existing IEEE 802.1x standards, it can be practiced without the need to modify existing authentication servers or change the authentication protocol. A secure wireless mesh network can be constructed with an existing authentication server.

As noted above, however, the invention is not limited to use of the IEEE 802.1x standards.

Those skilled in the art will recognize that further variations are possible within the scope of the invention, which is defined in the appended claims.

What is claimed is:

1. Wireless access point apparatus for use in each of the access points in a wireless network in which a plurality of access points communicate with each other over wireless links, the wireless network being connectable to an authentication server, the wireless access point apparatus comprising:
   an authenticator processing unit for passing authentication information from a device that requests authentication and mediating authentication processing by the authentication server by a predetermined authentication method;
   a supplicant processing unit for supplying authentication information to an authenticator device and requesting the authentication processing by the predetermined authentication method; and
   a function selector for selecting one of the authenticator processing unit and the supplicant processing unit when an unconnected access point is detected within communication range, an unconnected access point being any one of the access points that does not yet have a secure wireless link with the access point including the function selector; wherein the selected one of the authenticator processing unit and supplicant processing unit operates to establish a secure wireless link with the unconnected access point.

2. The wireless access point apparatus of claim 1, wherein the function selector operates upon reception of a beacon signal from the unconnected access point.

3. The wireless access point apparatus of claim 1, wherein the function selector selects the supplicant processing unit when the access point including the wireless access point apparatus cannot connect to the authentication server.

4. The wireless access point apparatus of claim 1, wherein the function selector selects the authenticator processing unit when the access point including the wireless access point apparatus can connect to the authentication server.

5. The wireless access point apparatus of claim 1, wherein the function selector selects the authenticator processing unit when the access point including the wireless access point apparatus can connect to the authentication server but lacks routing information for the unconnected access point.

6. The wireless access point apparatus of claim 1, wherein the function selector selects one of the authenticator processing unit and the supplicant processing unit by comparing mutual management information exchanged with the unconnected access point.

7. The wireless access point apparatus of claim 1, further comprising:
   an encryption information generator for generating encryption information specifically for the secure wireless link with the unconnected access point if the unconnected access point is authenticated by said authentication method; and
   an encryption information management unit for managing the encryption information generated specifically for each of one or more wireless links linking the access point including the wireless access point apparatus to other access points in the wireless network.

8. The wireless access point apparatus of claim 7, wherein the encryption information generator has a unicast communication encryption information generating section that generates encryption information for use in unicast communication with the unconnected access point.

9. The wireless access point apparatus of claim 8, wherein the unicast communication encryption information generating section receives encryption-related information related to the wireless link with the unconnected access point from the authentication server and generates the encryption information specifically for the wireless link with the unconnected access point from the encryption-related information.

10. The wireless access point apparatus of claim 7, wherein the encryption information generator has a broadcast communication encryption information generating section that generates encryption information for use in broadcast communication with a plurality of access points within communication range, further comprising a communication unit for transmitting the encryption information for broadcast communication to the plurality of access points within communication range.

11. The wireless access point apparatus of claim 10 wherein, when the communication unit receives from another access point encryption information for broadcast communication used by said another access point for broadcast communication, the encryption information management unit also manages the received encryption information for broadcast communication specifically for said another access point.

12. A wireless network connectable to an authentication server and comprising a plurality of access points having wireless access point apparatus of the type recited in claim 1.

\* \* \* \* \*

UNITED STATES PATENT AND TRADEMARK OFFICE
CERTIFICATE OF CORRECTION

PATENT NO. : 7,596,368 B2  Page 1 of 1
APPLICATION NO. : 11/354989
DATED : September 29, 2009
INVENTOR(S) : Yamada et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 726 days.

Signed and Sealed this

Twenty-eighth Day of September, 2010

David J. Kappos
*Director of the United States Patent and Trademark Office*